US012049413B1

United States Patent
Yang et al.

(10) Patent No.: US 12,049,413 B1
(45) Date of Patent: Jul. 30, 2024

(54) PREPARATION METHOD AND APPLICATION OF CELLULOSE/LIGNIN/CLAY COMPOSITE AEROGEL FOR HIGHLY EFFICIENT ADSORPTION OF ANTIBIOTICS

(71) Applicant: Nanjing University (Xianlin Campus), Nanjing (CN)

(72) Inventors: Hu Yang, Nanjing (CN); Na Li, Hainan (CN)

(73) Assignee: NANJING UNIVERSITY (XIANLIN CAMPUS), Nanjing (CN)

(*) Notice: Subject to any disclaimer, the term of this patent is extended or adjusted under 35 U.S.C. 154(b) by 0 days.

(21) Appl. No.: 18/410,499

(22) Filed: Jan. 11, 2024

(30) Foreign Application Priority Data

Mar. 29, 2023 (CN) .......................... 202310323117.2

(51) Int. Cl.
 *C02F 1/28* (2023.01)
 *B01J 20/12* (2006.01)
 (Continued)

(52) U.S. Cl.
 CPC ............... *C02F 1/288* (2013.01); *B01J 20/12* (2013.01); *B01J 20/24* (2013.01); *B01J 20/3085* (2013.01);
 (Continued)

(58) Field of Classification Search
 None
 See application file for complete search history.

(56) References Cited

FOREIGN PATENT DOCUMENTS

| CN | 105536726 A | 5/2016 |
| CN | 110591161 A | 12/2019 |

(Continued)

OTHER PUBLICATIONS

Finlay et al. (Materials, 2015, 8, 5440-5451). (Year: 2015).*

(Continued)

*Primary Examiner* — Clare M Perrin
(74) *Attorney, Agent, or Firm* — Muncy, Geissler, Olds & Lowe, P.C.

(57) ABSTRACT

The present invention belongs to the field of aqueous environmental treatment and specifically relates to a preparation method and application of a cellulose/lignin/clay composite aerogel for the efficient adsorption of antibiotics. Cellulose/lignin/clay composite aerogels were prepared by sol-gel, cross-linking, and freeze-drying methods, and the preparation method and operation process were simple and easy to reuse with a large yield. The raw materials used in the present invention are the natural polymer materials, cellulose, lignin, and clay minerals, which are widely available and non-toxic, cellulose and lignin are biodegradable and have no risk of secondary pollution. Cellulose can be used as the matrix of aerogels owing to its unique environmental friendliness, biodegradability, and excellent structural skeleton structure. Cellulose can be used as the skeleton of aerogels, and lignin and clay minerals can be used as modifiers, which can significantly improve the mechanical properties of cellulose aerogels and the adsorption properties of antibiotics. The cellulose/lignin/clay composite aerogel of the present invention presents excellent adsorption ability for antibiotics.

3 Claims, 4 Drawing Sheets

(51) Int. Cl.
  *B01J 20/24* (2006.01)
  *B01J 20/30* (2006.01)
  *B01J 20/32* (2006.01)
  *C08J 3/075* (2006.01)
  *C08J 3/24* (2006.01)
  *C02F 101/38* (2006.01)
  *C08J 3/205* (2006.01)

(52) U.S. Cl.
  CPC .......... *B01J 20/3274* (2013.01); *C08J 3/075* (2013.01); *C08J 3/24* (2013.01); *B01J 20/3234* (2013.01); *B01J 20/3282* (2013.01); *C02F 1/281* (2013.01); *C02F 1/286* (2013.01); *C02F 2101/38* (2013.01); *C08J 3/205* (2013.01); *C08J 2205/026* (2013.01)

(56) References Cited

FOREIGN PATENT DOCUMENTS

| | | |
|---|---|---|
| CN | 113877521 A | 1/2022 |
| CN | 114854081 A | 8/2022 |
| CN | 115490925 A | 12/2022 |

OTHER PUBLICATIONS

Madyan et al. (Composites Part B, 2016, 98, 314-329). (Year: 2016).*
Guigo et al. (Composites Science and Technology, 2009, 69, 1979-1984). (Year: 2009).*
Nedulcu et al. (Composites B, 2013, 55, 11-15). (Year: 2013).*
Ru et al., "Nanocellulose-Based Adsorption Materials," Progress in Chemistry, 2017, vol. 29 No. 10, pp. 1228-1251, 24 pages.

* cited by examiner

PREPARATION METHOD AND APPLICATION OF CELLULOSE/LIGNIN/CLAY COMPOSITE AEROGEL FOR HIGHLY EFFICIENT ADSORPTION OF ANTIBIOTICS

TECHNICAL FIELD

The present invention relates to preparing a composite aerogel by a simple cross-linking reaction of cellulose, lignin, and clay materials at room temperature, and having a better adsorption effect on antibiotics in aqueous solution, which belongs to the field of water treatment.

BACKGROUND ART

In recent years, with the increasing usage and production of antibiotics, the environmental pollution caused by the abuse of antibiotics has received more and more attention. The main sources of antibiotics mainly include the medical, livestock breeding, and pharmaceutical industries. However, antibiotics are poorly absorbed by organisms, and 70-80% of drugs in the form of original drugs or metabolites (conjugated state, oxidation products, hydrolysis products, etc.) are discharged into the aqueous environment following with feces and urine. Antibiotics can be classified into β-lactams, quinolones, macrolides, sulfonamides, and tetracyclines according to their chemical structures. Despite the low concentration of antibiotics was detected in the environment, large annual emissions, and long-term accumulation in the environment, pose a serious threat to human health and the ecological environment. It is of great significance to study the removal of antibiotics from aqueous environment.

At present, the removal methods of antibiotics from water mainly include biological treatment, coagulation, membrane separation, adsorption, and photocatalytic degradation. The removal efficiency of antibiotics by biological method is low, and the sludge should be treated; coagulation is mainly used for removal of hydrophobic and relatively large molecular weight antibiotics, and the waste after treatment still needs to be treated; the commonly used ultrafiltration membranes possess properties such as poor treatment effect and high operation cost; Adsorption is a commonly used method, which has the advantages of simple and safe operation, high separation efficiency for low-concentration pollutants, and guaranteeing the structure and function of pollutants. Therefore, it is necessary to develop an adsorbent with low cost, excellent adsorption capacity, and convenient reuse.

Aerogels are highly porous three-dimensional (3D) materials, which is usually prepared by sol-gel processes and appropriate drying techniques. Major advantages of aerogel adsorbents include tunable surface chemistry, low density, high specific surface area, and loose porous structure. Over the past few decades, aerogels with different precursors have been developed such as silica aerogel, graphene aerogel, carbon nanotubes aerogel, and cellulose aerogel. Cellulose is particularly suitable for the preparation of aerogels due to the unique environmental friendliness, biodegradability, and excellent skeleton structure, therefore there is a great potential for the application of cellulose aerogel in the separation and purification of wastewater. However, some problems also exist, such as single functional groups, weak adsorption capacity, and poor mechanical properties, which limit the practical application of cellulose aerogel. Therefore, it is of great significance to explore the physical and chemical modification of cellulose aerogel with high performance.

Lignin, which is the main by-product of the pulp and paper industry, is another kind of natural polymer material with wide source and low cost. Although lignin does not possess gel-forming properties, it can act as a chemical modifier for the functionalization of varied materials including cellulose aerogels, to synergistically enhance adsorption affinity for organic contaminants, owing to its unique aromatic nature and rich in oxygen-containing functional groups. Clay minerals, as natural adsorbents with unique internal structure, low cost, exchangeable cations, and reactive hydroxyl groups on the surface, have been employed for adsorption of dyes, heavy metals, and antibiotics in water.

Chinese patent CN115490925 discloses a kind of preparation method of an oxidized cellulose nanofibril/gelatin composite aerogel, which utilized oxidized cellulose nanofibrils as main network skeleton of the aerogel and gelatin as the reinforcing material, but the mechanical strength of the oxidized cellulose nanofibril/gelatin composite aerogel is not very high. Chinese patent CN115490925 discloses a preparation method of three-dimensional reticulated graphene aerogel, which is applied to adsorptive removal of ciprofloxacin and tetracycline. The preparation process requires hydrothermal reaction and high-temperature calcining equipment under the condition of nitrogen protection, even though the removal efficiency of antibiotics is high. Chinese patent CN105536726A discloses a kind of preparation method of graphene oxide/sodium alginate composite adsorbent for removing ciprofloxacin from aqueous environment, and the maximum adsorption capacity of ciprofloxacin is 26.03 mg/g, which is relatively lower, but the adsorption equilibrium time is so long, that is 3 days. In regard to the previous patents about aerogels for adsorbing antibiotics, there still exist some problems, such as low mechanical properties, limited functional groups, long synthesis time, complex reaction process, and low adsorption capacity.

SUMMARY OF THE INVENTION

The invention aims to provide a simple preparation method for synthesizing a novel composite aerogel by using natural polymer materials, cellulose and lignin, and clay mineral materials, and used highly efficient adsorption of antibiotics from water. A novel composite aerogel was prepared by sol-gel, cross-linking, and freeze-drying methods which applied cellulose as an aerogel framework, and lignin and clay minerals as modifiers. It is a new material, which can significantly improve the mechanical properties of cellulose aerogel and the adsorption capacity of antibiotics. The composite aerogel can achieve highly selective removal of ciprofloxacin from varied water sources in practical applications. The adsorption removal efficiency of antibiotics at the initial concentrations of 0.002 and 0.02 mmol/L reach more than 85%.

In order to solve the technical problem of the present invention, the technical scheme is proposed: a kind of preparation method of cellulose/lignin/clay composite aerogel for efficiently adsorbing antibiotics, which is a composite aerogel prepared by blending and crosslinking natural polymer materials and clay mineral materials. The natural polymer materials are cellulose and lignin, and the clay mineral material is montmorillonite, kaolin or attapulgite.

Natural polymer material, cellulose, is dissolved into a sodium hydroxide/urea/aqueous solution, after freeze-thawing, lignin and a clay material are respectively added into the cellulose solution, and the reactant is stirred at room temperature, and continue stirring at room temperature to form a gel after adding cross-linking agent, aging, and washing to neutrality with deionized water, and then freeze-drying, to obtain cellulose/lignin/clay composite aerogel adsorbent. The cross-linking agent is epichlorohydrin or N, N'-methylenebis(acrylamide).

Preferably, the natural polymer material, cellulose is dissolved in sodium hydroxide/urea/aqueous solution, the mass concentration of the cellulose solution is 4%-8%, 1-4 g of lignin and 1-5 g of clay material are respectively added to the cellulose solution, the reactant is stirred at room temperature for 30 min, 1-5 mL of a cross-linking agent is added, continuing stirring until gel is formed, aging for 12 h, washing with deionized water until the solution turn to neutral, and freeze-drying sustaining for 48 h, to obtain the cellulose/lignin/clay composite aerogel adsorbent.

Preferably, the mass ratio of the natural polymer material cellulose, lignin, and clay mineral is 2:2:3; the clay mineral material is montmorillonite; the cross-linking agent is epichlorohydrin, and the added volume of the cross-linking agent is 3 mL.

(1) pre-cooling a sodium hydroxide/urea/aqueous solution with a mass ratio of 7:12:81 to −20° C. for 2 h, then dissolving the cellulose powder in the above-mentioned solution, and freezing at −20° C. for 2 h to obtain a cellulose solution with a mass concentration of 4%;

(2) successively adding lignin to the cellulose solution and stirring until the lignin is completely dissolved, then adding montmorillonite, and stirring until the montmorillonite is uniformly distributed in the solution, the mass ratio of cellulose, lignin, and montmorillonite is 2:2:3; the reaction was stirred at room temperature for 30 min;

(3) slowly dropping the cross-linking agent epichlorohydrin into the mixture, and continuing stirring at room temperature until gelation, aging for 12 h, and finally washing repeatedly with deionized water until neutral, and freeze-drying at −60° C. for 48 h to obtain a cellulose/lignin/montmorillonite composite aerogel.

Preferably, the cellulose, lignin, and montmorillonite are cross-linked in one step using the cross-linking agent epichlorohydrin.

Preferably, the above synthesis is performed at room temperature.

Preferably, comprising the steps of:

(1) preparing 50 mL of a sodium hydroxide/urea/aqueous solution with amass ratio of 7:12:81, pre-cooling to −20° C. for 2 h, then dissolving the cellulose powder in the above mentioned solution, and freezing at −20° C. for 2 h to obtain a transparent cellulose solution with a mass concentration of 4%;

(2) successively adding 2 g of lignin and 3 g of montmorillonite into a cellulose solution, wherein the mass ratio of cellulose, lignin, and montmorillonite is 2:2:3, stirring and reacting at room temperature for 30 min, adding 3 mL of cross-linking agent epichlorohydrin, continuing stirring until a gel formed, aging for 12 h, washing until neutral with deionized water, and freeze-drying at −60° C. for 48 h, to obtain a cellulose/lignin/montmorillonite composite aerogel.

In order to solve the technical problem of the present invention, another technical solution is proposed as follows: the use of a cellulose/lignin/clay composite aerogel for the efficient adsorption of antibiotics, the cellulose/lignin/clay composite aerogel being capable of efficiently adsorbing antibiotics from wastewater and being conveniently reused.

Preferably, the antibiotics are sulfonamides, fluoroquinolones, tetracyclines, or β-lactams with the adsorption removal efficiency of more than 85% at the initial concentration of 0.002 or 0.02 mmol/L.

Compared to the Prior Art, the Advantageous Effects of the Present Invention are as Follows:

(1) The cellulose/lignin/clay composite aerogel is prepared by a simple cross-linking method at room temperature, and the preparation method and operation process are simple, low cost, and high yield.

(2) The raw materials used in the present invention are the natural polymer materials, cellulose, lignin, and clay minerals, which are widely available with low cost, cellulose and lignin are biodegradable and have no risk of secondary pollution. Cellulose can be used as the matrix of aerogels because of its excellent skeleton structure. Lignin contains a large number of functional groups such as hydroxyl, carboxyl, and benzene ring, and the surface of clay has exchangeable cations and active hydroxyl groups. A new type of composite aerogel was prepared by using cellulose as the aerogel skeleton and lignin and clay as modifiers. It is a new material, which can significantly improve the mechanical properties of cellulose aerogel and the adsorption capacity of antibiotics.

(3) The cellulose/lignin/clay composite aerogel of the present invention possess a good adsorption effect on antibiotics over a wide pH range (2.0-9.0), which overcomes the disadvantage of the strong pH dependence of many ionic adsorbents in application. Considering the adsorption effect and practical application conditions, pH 5.0 was chosen as the optimal pH.

(4) The adsorption capacity of cellulose/lignin/clay composite aerogels, cellulose/clay composite aerogels, cellulose/lignin composite aerogels, and cellulose aerogels decreased gradually, which was mainly due to the multiple mechanisms of composite aerogels, including electrostatic attraction of lignin and clay to antibiotics, π-π electron donor-acceptor interaction, hydrogen bonding, and negative charge assisted hydrogen bonding, cation exchange and complexation, and chelating effect of lignin and clay intercalated cation on antibiotics, which significantly improved the adsorption ability of antibiotics.

(5) Cellulose/lignin/clay composite aerogel can be used to adsorb low-concentration antibiotics in actual water bodies. This indicates that the composite aerogel can achieve high selective adsorption of antibiotics from various water sources in practical application. The adsorption removal efficiency of antibiotics with the initial concentrations of 0.002 mmol/L and 0.02 mmol/L reaches more than 85%.

DETAILED DESCRIPTION OF THE INVENTION

The present invention is further illustrated by the following examples.

Example 1

A Preparation Method of a Cellulose/Lignin/Clay Composite Aerogel (1) 50 mL of sodium hydroxide/urea/aqueous solution with a mass ratio of 7:12:81 was prepared, pre-cooled to −20° C. for 2 h, then dissolved the cellulose powder in the above-mentioned solution, and froze at −20° C. for 2 h to obtain a transparent cellulose solution with a mass concentration of 4%.

(2) 2 g of lignin and 3 g of montmorillonite were successively added into a cellulose solution, wherein the mass ratio of cellulose, lignin, and montmorillonite was 2:2:3, stirring and reacting at room temperature for 30 min, 3 mL of cross-linking agent epichlorohydrin was added, continuing stirring until a gel formed, the reaction system was aged for 12 h, washed with deionized water until neutral pH, and freeze-dried at −60° C. for 48 h, to obtain a cellulose/lignin/montmorillonite composite aerogel.

Lignin was added to the cellulose solution, stirring at room temperature until the lignin was completely dissolved, the mass ratio of cellulose to lignin was 1:1, and 3 mL of the cross-linking agent epichlorohydrin was added, continuing stirring until a gel was formed, the reaction system was aged for 12 h, washed to neutrality with deionized water, and freeze-dried at −60° C. for 48 h, to obtain a cellulose/lignin composite aerogel.

Montmorillonite was added to the cellulose solution in a mass ratio of cellulose to montmorillonite of 2:3, stirring at room temperature until the montmorillonite was uniformly dispersed in the cellulose solution, 3 mL of the cross-linking agent epichlorohydrin was added, continuing stirring until a gel formed, the reaction system was aged for 12 h, washed until neutral with deionized water, and freeze-dried at −60° C. for 48 h, to obtain a cellulose/montmorillonite composite aerogel.

Figure 1:
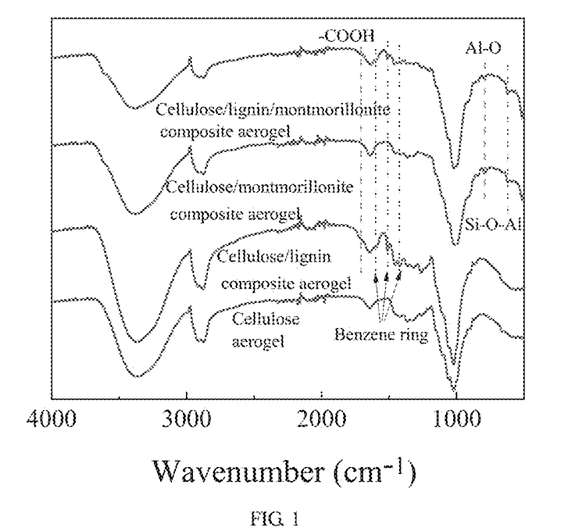
FIG. 1 is the infrared spectra of cellulose aerogel, cellulose/lignin composite aerogel, cellulose/montmorillonite composite aerogel, and cellulose/lignin/montmorillonite composite aerogel.

FIG. 1 is the infrared spectra of cellulose aerogel, cellulose/lignin composite aerogel, cellulose/montmorillonite composite aerogel, and cellulose/lignin/montmorillonite composite aerogel. The aromatic skeleton vibration peaks of lignin at 1590, 1510, and 1419 $cm^{-1}$ in cellulose/lignin composite aerogel and Al—O and Si—O—Al tensile vibration peaks of montmorillonite at 795 and 514 $cm^{-1}$ in cellulose/montmorillonite composite aerogel. The above characteristic peaks were also observed in cellulose/lignin/montmorillonite composite aerogel. In addition, the peaks of the aromatic skeleton and carboxyl group of lignin in cellulose/lignin/montmorillonite composite aerogel changed slightly, indicating that the complex reaction between lignin and montmorillonite may occur.

Figure 2:
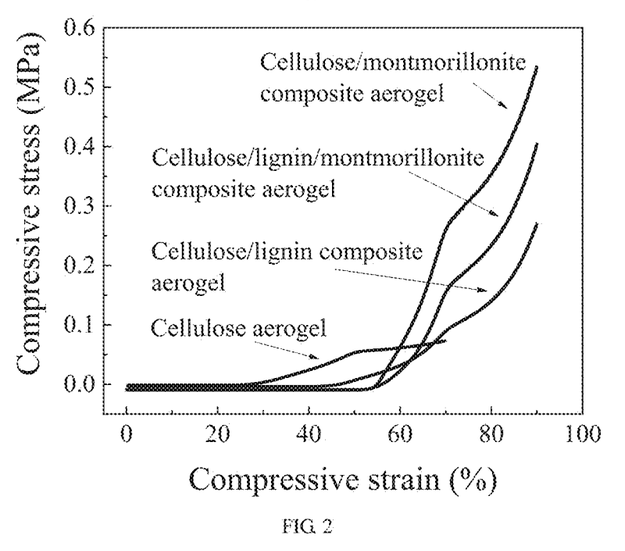
FIG. 2 is a graph showing the compressive strength of cellulose aerogel, cellulose/lignin composite aerogel, cellulose/montmorillonite composite aerogel, and cellulose/lignin/montmorillonite composite aerogel.

FIG. 2 shows a significant increase in the compressive strength of the cellulose/lignin/montmorillonite composite aerogel in comparison to that of the cellulose aerogel.

Figure 3:
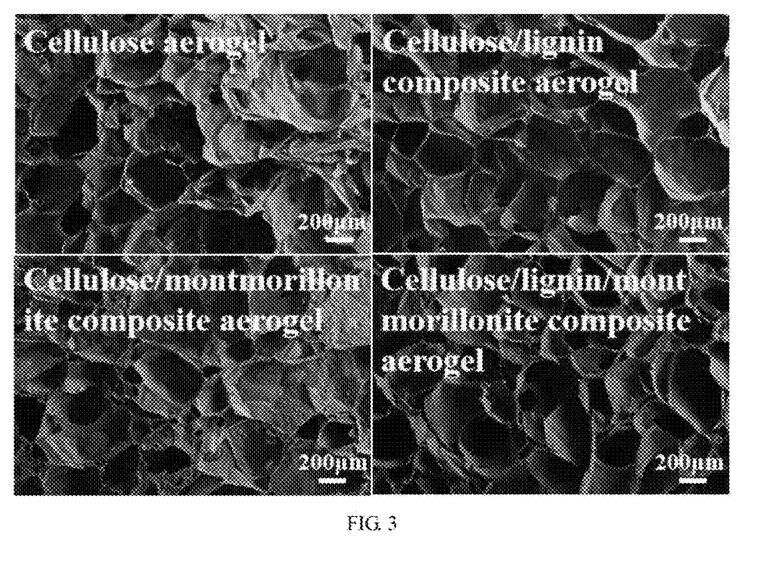
FIG. 3 is the field emission scanning electron micrograph of cellulose aerogel, cellulose/lignin composite aerogel, cellulose/montmorillonite composite aerogel, and cellulose/lignin/montmorillonite composite aerogel.

FIG. 3, a field emission scanning electron micrograph, shows that the cellulose/lignin/montmorillonite composite aerogel presents a layered porous structure with many irregular clusters and increased the pore wall thickness.

Figure 4:
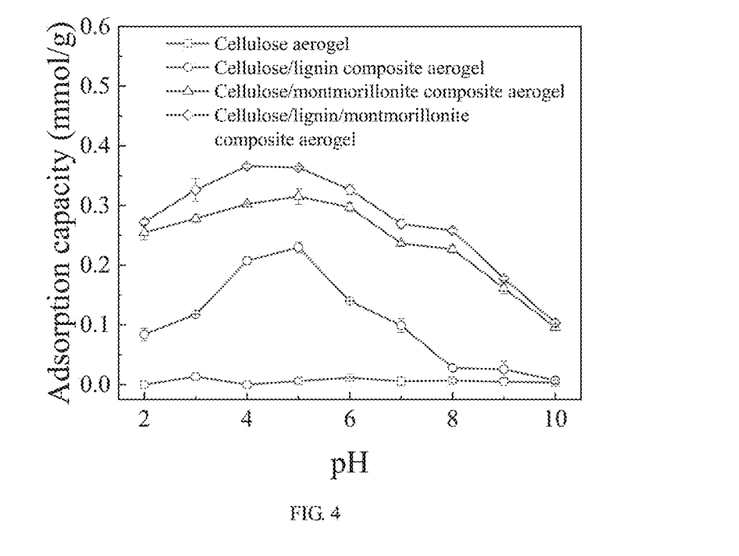
FIG. 4 is a graph showing the adsorption capacities of cellulose aerogel, cellulose/lignin composite aerogel, cellulose/montmorillonite composite aerogel, and cellulose/lignin/montmorillonite composite aerogel for ciprofloxacin, a fluoroquinolone antibiotic, under different pH conditions.

FIG. 4 is a graph comparing the adsorption effect at different pHs of laboratory-simulated water samples which is wastewater containing ciprofloxacin, a fluoroquinolone antibiotic. In this process, the concentrations of ciprofloxacin before and after aerogel adsorption were determined by high-performance liquid chromatography, and the adsorption effects of cellulose aerogel, cellulose/lignin composite aerogel, cellulose/montmorillonite composite aerogel and cellulose/lignin/montmorillonite composite aerogel on ciprofloxacin were gradually enhanced (the comparison results of adsorption capacity of composite aerogel are shown in Table 1), mainly due to the multiple interaction mechanism of cellulose/lignin/montmorillonite composite aerogel on ciprofloxacin after cellulose, lignin and montmorillonite composite, in addition to the electrostatic attraction of lignin and clay to antibiotics. π-π electron donor-acceptor interactions, common hydrogen bonding, and negative charge assisted hydrogen bonding, cation exchange, and complexation, as well as chelation of antibiotics by lignin and the cations on the montmorillonite surface, significantly improve the adsorption capacity for ciprofloxacin. Cellulose/lignin/montmorillonite composite aerogels had a good adsorption effect on ciprofloxacin in a wide pH range (2.0-9.0), especially at pH 4.0-6.0. Considering the adsorption effect and practical application of water environment conditions, the following adsorption experiment was proceeded at pH 5.0 (pH value was adjusted by adding 0.1 mol/L hydrochloric acid and 0.1 mol/L sodium hydroxide solution).

TABLE 1

Comparison of the adsorption capacity of the three aerogels in Example 1 (pH = 5.0)

| Composite adsorbent | Cellulose/ lignin composite aerogel | Cellulose/ montmorillonite composite aerogel | Cellulose/ lignin/ montmorillonite composite aerogel |
| --- | --- | --- | --- |
| Adsorption capacity (mmol/g) | 0.230 | 0.315 | 0.364 |

Figure 5:
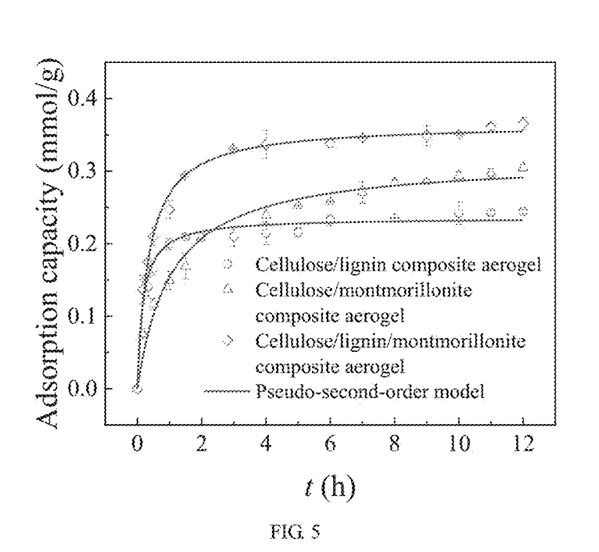
FIG. 5 is a graph showing the adsorption kinetics of cellulose/lignin composite aerogel, cellulose/montmorillonite composite aerogel, and cellulose/lignin/montmorillonite composite aerogel for ciprofloxacin, a fluoroquinolone antibiotic.

FIG. 5 is a graph showing the adsorption kinetics of a fluoroquinolone antibiotic, ciprofloxacin, by cellulose/lignin/montmorillonite composite aerogel. When the initial ciprofloxacin concentration in simulated wastewater was 0.2 mmol/L, 10 mg composite aerogel was added into 30 mL of ciprofloxacin solution at pH 5.0, and the adsorption time was 12 h. It can be seen from FIG. 5 that the adsorption capacity of cellulose/lignin/montmorillonite composite aerogel for ciprofloxacin can basically reach saturation at an adsorption time of 6 h, and can reach the maximum adsorption effect at adsorption time 12 h.

It can be seen from FIG. 5 that the adsorption capacity of cellulose/lignin/montmorillonite composite aerogel and cellulose/lignin composite aerogel for ciprofloxacin increased more significantly than that of cellulose/montmorillonite composite aerogel in the initial contact stage (<2 h), and then the adsorption equilibrium was reached, and the adsorption process conformed to Pseudo-second-order kinetics model. The higher adsorption rates of cellulose/lignin/montmorillonite composite aerogels and cellulose/lignin composite aerogels are mainly due to some transient interactions between lignin and ciprofloxacin, such as electrostatic attraction. In addition, there may be a synergistic effect between lignin and montmorillonite in cellulose/lignin/montmorillonite composite aerogel, and the chelate among carboxyl group of lignin, cation in clay intercalation and ciprofloxacin, which further accelerates the adsorption of ciprofloxacin on ternary composite aerogel.

Figure 6:
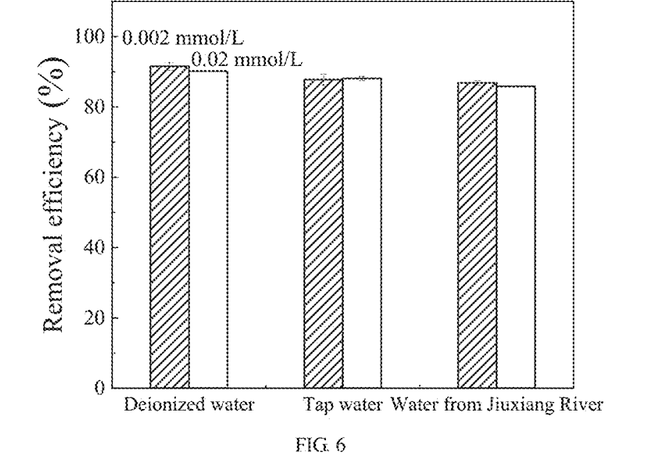
FIG. 6 is a graph showing the adsorption effect of cellulose/lignin/montmorillonite composite aerogel on ciprofloxacin with low concentrations in different water bodies.
Figure 7:
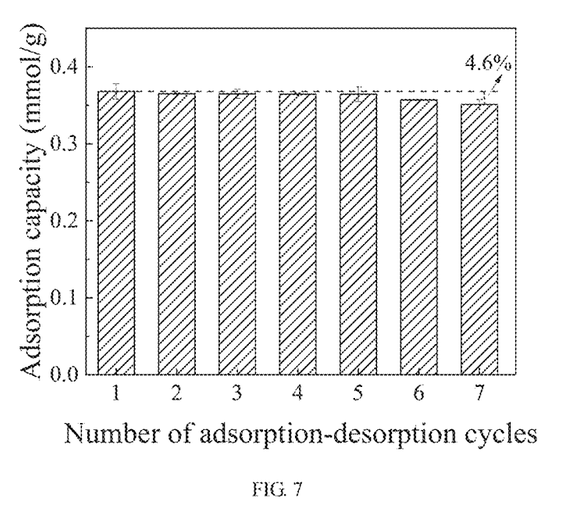
FIG. 7 is a graph showing the recycling effect of cellulose/lignin/montmorillonite composite aerogel to adsorb the antibiotic ciprofloxacin.
Figure 8:
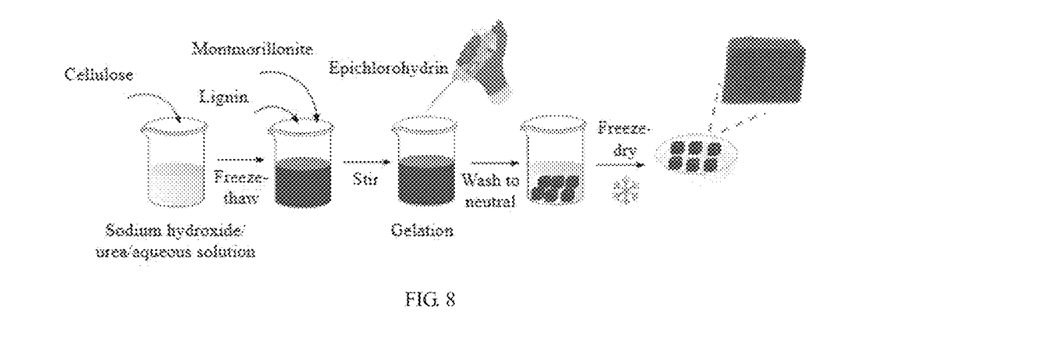
FIG. 8 is a schematic diagram of the preparation method of cellulose/lignin/clay composite aerogel for efficient adsorption of antibiotics.

It can be seen from FIG. 6 that cellulose/lignin/montmorillonite composite aerogel still has a good adsorption effect on low concentrations of ciprofloxacin in different water bodies. The removal efficiency of ciprofloxacin by cellulose/lignin/montmorillonite composite aerogel in deionized water, tap water, and surface water from Jiuxiang River of Nanjing with the initial ciprofloxacin concentration of 0.002 and 0.02 mmol/L was studied. The removal efficiency of ciprofloxacin by cellulose/lignin/montmorillonite composite aerogel was shown in FIG. 6. The removal efficiency of ciprofloxacin was more than 90% in deionized water. In tap water and water from Jiuxiang River, the adsorption efficiency of cellulose/lignin/montmorillonite composite aerogel for low-concentration ciprofloxacin was slightly lower than that of deionized water, but the decrease range was less than 5%, indicating that the adsorption capacity of low-concentration ciprofloxacin by cellulose/lignin/montmorillonite composite aerogel was not interfered by water source. Cellulose/lignin/montmorillonite composite aerogels achieve highly selective removal of ciprofloxacin from various water sources in practical applications. It can be seen from FIG. 7 that cellulose/lignin/montmorillonite composite aerogel still has a better adsorption effect on ciprofloxacin after 7 times of adsorption-desorption. Compared with the first adsorption, the adsorption capacity only decreases by 4.6%, and the recycling of cellulose/lignin/montmorillonite composite aerogel is better.

Example 2

A Preparation Method of a Cellulose/Lignin/Clay Composite Aerogel (1) 50 mL of a sodium hydroxide/urea/aqueous solution with a mass ratio of 7:12:81 was prepared, pre-cooled to −20° C. for 2 h, then dissolved the cellulose powder in the above-mentioned solution, and froze at −20° C. for 2 h to obtain a transparent cellulose solution with a mass concentration of 4%;

(2) lignin and montmorillonite were successively added into a cellulose solution, wherein the mass ratio of cellulose, lignin, and montmorillonite was 2:2:1, 1:1:1, 2:2:3, respectively, stirring and reacting at room temperature for 30 min, 3 mL of cross-linking agent epichlorohydrin was added, continuing stirring until a gel formed, the reaction system was aged for 12 h, washed with deionized water until neutral pH, and freeze-dried for 48 h, to obtain a cellulose/lignin/montmorillonite composite aerogel adsorbent.

The wastewater containing ciprofloxacin was a laboratory-simulated water sample. The initial ciprofloxacin concentration in the simulated wastewater was 0.2 mmol/L, the solution pH was 5.0, and 10 mg composite adsorbent was added for adsorption for 12 h. In this process, the concentration of ciprofloxacin before and after aerogel adsorption was detected by high-performance liquid chromatography, and the adsorption capacity of cellulose/lignin/montmorillonite composite adsorbent with the feed ratio of 2:2:3 in Example 1 was compared (Table 2). As the dosage of montmorillonite increased, the adsorption capacity of cellulose/lignin/montmorillonite composite adsorbent for ciprofloxacin increased gradually. Considering that the elasticity of composite aerogel would be decreased by increasing the dosage of montmorillonite, 2:2:3 was the optimal feed ratio.

TABLE 2

Comparison of the adsorption capacity of cellulose/lignin/montmorillonite composite aerogels with different feed mass ratios in Example 2

| Feed mass ratio (cellulose: Lignin: montmorillonite) | 2:2:1 | 1:1:1 | 2:2:3 |
|---|---|---|---|
| Adsorption capacity (mmol/g) | 0.268 | 0.340 | 0.364 |

Example 3

A Preparation Method of a Cellulose/Lignin/Clay Composite Aerogel (1) 50 mL of a sodium hydroxide/urea/aqueous solution with a mass ratio of 7:12:81 was prepared, pre-cooled to −20° C. for 2 h, then dissolved the cellulose powder in the above-mentioned solution, and froze at −20° C. for 2 h to obtain a transparent cellulose solution with a mass concentration of 4%;

(2) 2 g of lignin and 3 g of montmorillonite were successively added into a cellulose solution, wherein the mass ratio of cellulose, lignin, and montmorillonite was 2:2:3, stirring and reacting at room temperature for 30 min, 3 mL of cross-linking agent epichlorohydrin was added, continuing stirring until a gel formed, the reaction system was aged for 12 h, washed with deionized water until neutral pH, and freeze-dried for 48 h, to obtain a cellulose/lignin/montmorillonite composite aerogel adsorbent, and using the same preparation conditions, cellulose/lignin composite aerogel (cellulose and lignin mass ratio 1:1) and cellulose/montmorillonite composite aerogel (cellulose and montmorillonite mass ratio 2:3) were prepared for comparison.

The wastewater containing sulfamethoxazole antibiotic, trimethoprim is a laboratory-simulated water sample. The initial concentration of sulfonamide antibiotics in the simulated wastewater is 0.2 mmol/L, the pH is 5.0, and 10 mg of composite adsorbent is added for adsorption for 12 h. In this process, the concentration of trimethoprim before and after aerogel adsorption is detected by high-performance liquid chromatography. The adsorption capacities of three kinds of composite aerogels for trimethoprim are shown in Table 3. The adsorption capacities of cellulose/lignin composite aerogel, cellulose/montmorillonite composite aerogel, and cellulose/lignin/montmorillonite composite aerogel for trimethoprim gradually increased.

TABLE 3

Comparison of the adsorption capacity of the three composite aerogels in Example 3

| Composite aerogel | Cellulose/lignin composite aerogel | Cellulose/montmorillonite composite aerogel | Cellulose/lignin/montmorillonite composite aerogel |
|---|---|---|---|
| Adsorption capacity (mmol/g) | 0.146 | 0.242 | 0.286 |

Example 4

A Preparation Method of a Cellulose/Lignin/Clay Composite Aerogel (1) 50 mL of a sodium hydroxide/urea/aqueous solution with a mass ratio of 7:12:81 was prepared, pre-cooled to −20° C. for 2 h, then dissolved the cellulose powder in the above-mentioned solution, and froze at −20° C. for 2 h to obtain a transparent cellulose solution with a mass concentration of 4%;

(2) 2 g of lignin and 3 g of montmorillonite were successively added into a cellulose solution, wherein the mass ratio of cellulose, lignin, and montmorillonite was 2:2:3, stirring and reacting at room temperature for 30 min, 3 mL of cross-linking agent epichlorohydrin was added, continuing stirring until a gel formed, the reaction system was aged for 12 h, washed with deionized water until neutral pH, and freeze-dried for 48 h, to obtain a cellulose/lignin/montmorillonite composite aerogel adsorbent, and using the same preparation conditions, cellulose/lignin composite aerogel (cellulose and lignin mass ratio 1:1) and cellulose/montmorillonite composite aerogel (cellulose and montmorillonite mass ratio 2:3) were prepared for comparison.

The wastewater containing the antibiotic tetracycline was a laboratory-simulated water sample. The initial concentration of antibiotic tetracycline in the simulated wastewater was 0.2 mmol/L, and the pH value was 5.0, 10 mg composite adsorbent was added for adsorption for 12 h. In this process, the concentration of tetracycline before and after aerogel adsorption was determined by high-performance liquid chromatography. The adsorption capacities of three kinds of composite aerogels for tetracycline are shown in Table 4. The adsorption capacities of cellulose/lignin composite aerogels, cellulose/montmorillonite composite aerogels, and cellulose/lignin/montmorillonite composite aerogels for tetracycline gradually increased. In conjunction with Examples 2, 3, and 4, it is demonstrated that cellulose/lignin/montmorillonite composite aerogel has good adsorption universality in practical water treatment, and can remove various antibiotics of different classes.

TABLE 4

Comparison of the adsorption capacity of the three composite aerogels in Example 4

| Composite aerogel | Cellulose/ lignin composite aerogel | Cellulose/ montmorillonite composite aerogel | Cellulose/ lignin/ montmorillonite composite aerogel |
| --- | --- | --- | --- |
| Adsorption capacity (mmol/g) | 0.041 | 0.104 | 0.167 |

Example 5

A Preparation Method of a Cellulose/Lignin/Clay Composite Aerogel (1) 50 mL of a sodium hydroxide/urea/aqueous solution with a mass ratio of 7:12:81 was prepared, pre-cooled to −20° C. for 2 h, then dissolved the cellulose powder in the above-mentioned solution, and froze at −20° C. for 2 h to obtain a transparent cellulose solution with a mass concentration of 4%;

(2) 2 g of lignin and 3 g of montmorillonite were successively added into a cellulose solution, wherein the mass ratio of cellulose, lignin, and montmorillonite was 2:2:3, respectively, stirring and reacting at room temperature for 30 min, 1 mL, 2 mL and 3 mL of cross-linking agent epichlorohydrin was added, continuing stirring until a gel formed, the reaction system was aged for 12 h, washed with deionized water until neutral pH, and freeze-dried for 48 h, to obtain a cellulose/lignin/montmorillonite composite aerogel.

The results showed that the mixture of cellulose, lignin and montmorillonite could not form a gel when the volume of cross-linking agent epichlorohydrin was 1 mL; 2 mL and 3 mL of cross-linking agent epichlorohydrin could make the mixture of cellulose, lignin and montmorillonite completely cross-linked and form a gel; when 3 mL of cross-linking agent was added, the mechanical properties of aerogels were better. Considering that increasing the cross-linking agent may cause excessive cross-linking which would consume adsorption sites and reduce adsorption capacity, the optimal dosage of the cross-linking agent was 3 mL.

Example 6

A Preparation Method of a Cellulose/Lignin/Clay Composite Aerogel (1) 50 mL of a sodium hydroxide/urea/aqueous solution with a mass ratio of 7:12:81 was prepared, pre-cooled to −20° C. for 2 h, then dissolved the cellulose powder in the above-mentioned solution, and froze at −20° C. for 2 h to obtain a transparent cellulose solution with a mass concentration of 4%;

(2) 2 g of lignin and 1 g of kaolin were successively added into a cellulose solution, wherein the mass ratio of cellulose, lignin and kaolin was 2:2:1, respectively, stirring and reacting at room temperature for 30 min, 2 mL of a cross-linking agent N, N'-methylenebis(acrylamide) was added, continuing stirring until a gel formed, the reaction system was aged for 12 h, washed with deionized water until neutral pH, and freeze-dried for 48 h, to obtain a cellulose/lignin/kaolin composite aerogel adsorbent.

The wastewater containing the antibiotic ciprofloxacin was employed as water sample. The initial concentration of antibiotic ciprofloxacin in simulated wastewater was 0.2 mmol/L, and 10 mg composite adsorbent was added for adsorption for 12 h. In this process, the concentration of ciprofloxacin antibiotics before and after aerogel adsorption was detected by high-performance liquid chromatography.

Example 7

A Preparation Method of a Cellulose/Lignin/Clay Composite Aerogel (1) 50 mL of a sodium hydroxide/urea/aqueous solution with a mass ratio of 7:12:81 was prepared, pre-cooled to −20° C. for 2 h, then dissolved the cellulose powder in the above-mentioned solution, and froze at −20° C. for 2 h to obtain a transparent cellulose solution with a mass concentration of 4%;

(2) 2 g of lignin and 2 g of attapulgite was successively added into a cellulose solution, wherein the mass ratio of cellulose, lignin and attapulgite was 1:1:1, respectively, stirring and reacting at room temperature for 30 min, 2 mL of a cross-linking agent N, N'-methylenebis(acrylamide) was added, continuing stirring until a gel formed, the reaction system was aged for 12 h, washed with deionized water until neutral pH, and freeze-dried for 48 h, to obtain a cellulose/lignin/attapulgite composite aerogel adsorbent.

The wastewater containing β-lactam antibiotics was utilized as a laboratory-simulated water sample, and the initial concentration of β-lactam antibiotics in the simulated wastewater was 0.2 mmol/L, and 10 mg composite adsorbent was added into the antibiotics solution for 12-h adsorption. The concentration of β-lactam antibiotics before and after adsorption by this aerogel was determined by high-performance liquid chromatography.

The invention claimed is:

1. A method for efficient adsorption of antibiotics, comprising:
    preparing 50 mL of a sodium hydroxide/urea/aqueous solution with a mass ratio of 7:12:81, pre-cooling to −20° C. for 2 h, then dissolving a cellulose powder in the sodium hydroxide/urea/aqueous solution, and freezing at −20° C. for 2 h to obtain a transparent cellulose solution with a mass concentration of 4%;
    successively adding 2 g of lignin and 3 g of montmorillonite into the cellulose solution, wherein a mass ratio of cellulose, lignin, and montmorillonite is 2:2:3, stirring and reacting at room temperature for 30 min, adding 3 mL of a cross-linking agent epichlorohydrin, continuously stirring to form a gel, aging for 12 h, washing with deionized water until a pH value of the water after the washing is neutral, and freeze-drying at −60° C. for 48 h to obtain a cellulose/lignin/montmorillonite composite aerogel; and
    using the cellulose/lignin/montmorillonite composite aerogel for efficient adsorption of antibiotics by contacting the cellulose/lignin/montmorillonite composite aerogel with water comprising the antibiotics.

2. The method of claim 1, wherein the antibiotics are sulfonamides, fluoroquinolones, tetracyclines or β-lactams, and an adsorption removal efficiency of antibiotics with an initial concentration of 0.002 or 0.02 mmol/L reaches above 85%.

3. The method of claim 1,
    wherein the antibiotics comprises ciprofloxacin,
    wherein the step of using the cellulose/lignin/montmorillonite composite aerogel for efficient adsorption of antibiotics comprises contacting the cellulose/lignin/montmorillonite composite aerogel with wastewater containing ciprofloxacin at pH 5.0 to absorb ciprofloxacin, and an adsorption capacity of the cellulose/lignin/montmorillonite composite aerogel for ciprofloxacin is 0.364 mmol/g, the adsorption capacity of cellulose/lignin/montmorillonite composite aerogel for ciprofloxacin reaches saturation after adsorption for 6 h, and the highest adsorption efficiency is achieved after adsorption for 12 h.

* * * * *